United States Patent

[11] 3,626,228

| [72] | Inventors | David D. Jordan;<br>Ward C. Suttle, both of South Bend, Ind. |
|---|---|---|
| [21] | Appl. No. | 42,397 |
| [22] | Filed | June 1, 1970 |
| [45] | Patented | Dec. 7, 1971 |
| [73] | Assignee | The Bendix Corporation |

[54] WHEEL SPEED SENSOR FOR AN ADAPTIVE BRAKING SYSTEM
7 Claims, 6 Drawing Figs.

[52] U.S. Cl............................................. 310/168,
310/80, 310/91, 105/215 C
[51] Int. Cl..................................................... H02k 19/20
[50] Field of Search........................................... 310/79–82,
168–171, 112, 114, 91, 120, 121; 73/529;
74/11–13; 324/174; 179/100.2 T; 295/36, 43;
105/61, 217, 118, 215 C; 108/55; 317/5; 303/20,
21

[56] References Cited
UNITED STATES PATENTS

| 1,797,579 | 3/1931 | Hoffman..................... | 74/12 |
| 3,447,838 | 6/1969 | Haviland..................... | 74/13 |
| 3,469,135 | 9/1969 | Haviland..................... | 310/170 |
| 3,509,395 | 4/1970 | Schrecongost............... | 310/168 |
| Re.22,549 | 9/1944 | Plensler....................... | 310/82 |
| 3,515,920 | 6/1970 | Jones........................... | 310/168 |
| 3,482,129 | 12/1969 | Riordan........................ | 310/168 |

*Primary Examiner*—D. F. Duggan
*Assistant Examiner*—R. Skudy
*Attorneys*—William N. Antonis and Plante, Hartz, Smith & Thompson ABSTRACT: A wheel speed sensor for use in an adaptive braking system comprising a magnetic pickup and a tone wheel. The tone wheel of a so-called "frictionless"-type wheel speed sensor is formed in two pieces, one of which is a low mass disk or cup adapted to be mounted on the outside of the axle flange and be clamped between the brake drum and said flange. The other is a rather massive cross section ring of ferromagnetic material secured to the outer margin of the disk and formed with evenly spaced gearlike teeth. The toothed portion may be formed by rolling a straight rack element into a circular shape.

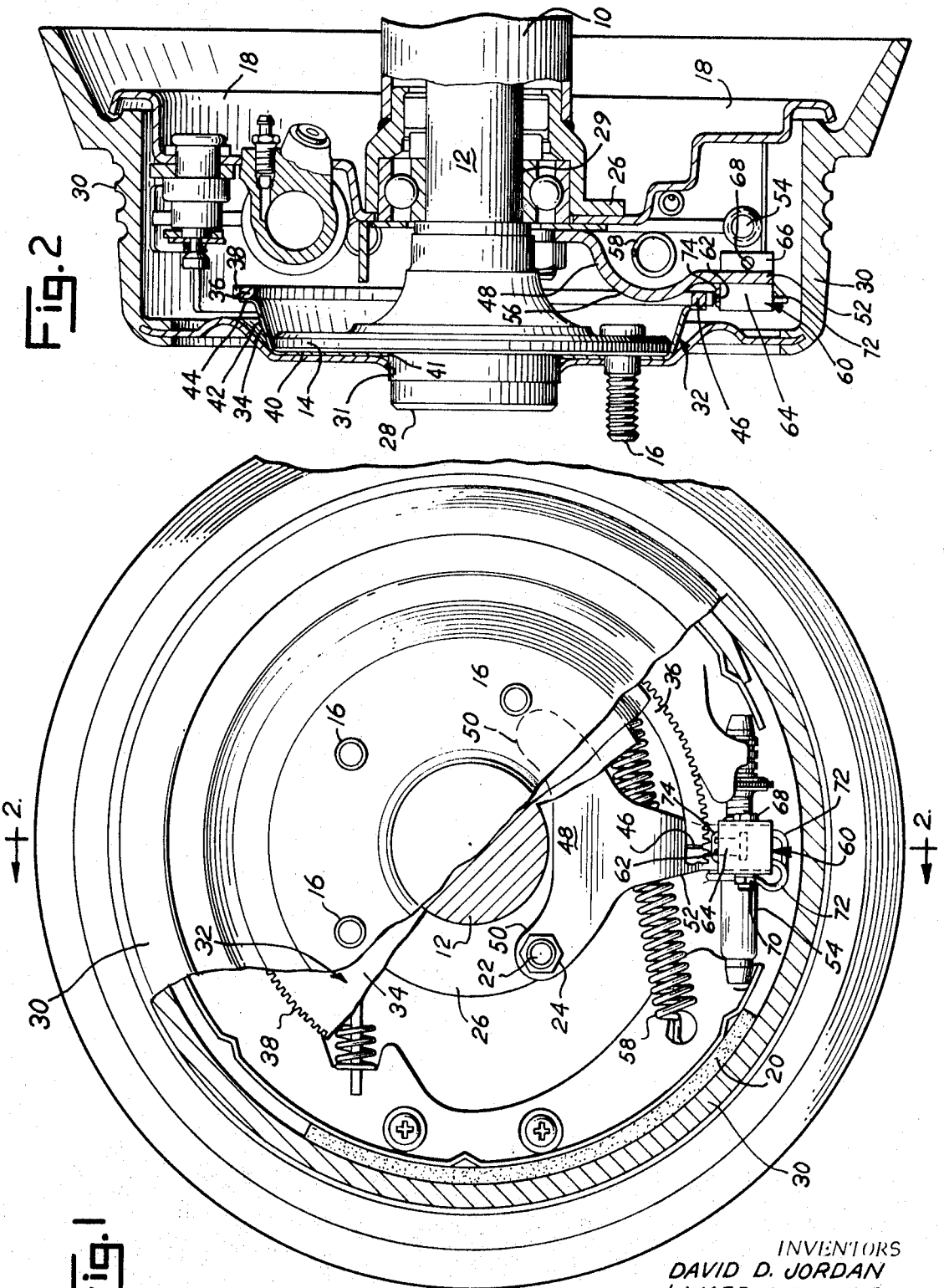
INVENTORS
DAVID D. JORDAN
& WARD C. SUTTLE
BY Planté, Hartz, Smith & Thompson
ATTORNEYS

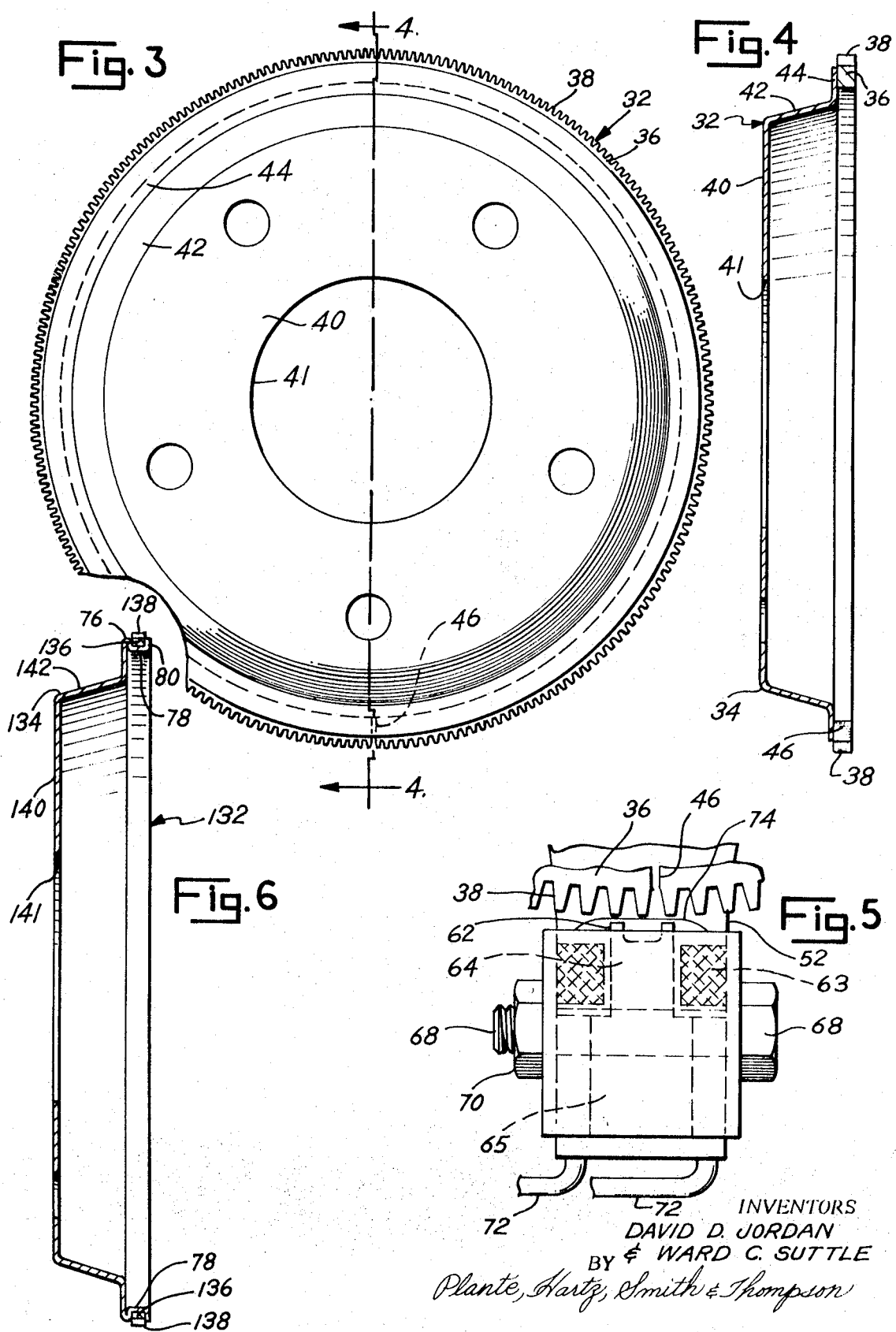

WHEEL SPEED SENSOR FOR AN ADAPTIVE BRAKING SYSTEM

SUMMARY OF THE INVENTION

This invention relates to an adaptive braking system for use on an automobile. More specifically, it relates to the wheel speed sensor which provides the adaptive braking system with information relative to the speed and acceleration of one of the several wheels of an automotive vehicle. An adaptive braking system of the type in which the invention would be used is illustrated in U.S. Pat. No. 3,494,671. Wheel speed sensors of the same general class and of which this is an improvement are described in U.S. application Ser. No. 42,396, filed June 1, 1970, also having in common with this application the same assignee.

The object of this invention is to provide a frictionless speed sensor sufficiently compact to conveniently fit into the cavity of an automotive drum or disk brake. The problem is to provide a ring of magnetic material containing a sufficient quantity of equally spaced bars of sufficient mass, and which can be attached to a rotating wheel or axle shaft. When passed adjacent to a magnetic pickup, the equally spaced bars will excite an electrical signal of suitable strength and quality in a magnetic pickup.

Another object of this invention is to locate the magnetic pickup in proximity to the tone wheel in such a way that the clearance relationship between the two elements will not be greatly affected by the usual dimensional variations of the vehicle parts, axle end play, or shifts due to distortion of the parts under varying loads. Other attempts have been made to solve the aforementioned problems with a device of this kind. Many of the previous approaches have been abandoned because the signal produced was unusable due to the large clearance between the magnetic pickup and the tone wheel, or to the low mass of magnetic material that was used.

This invention proposes a new type of speed sensor for adaptive braking systems which is unique in design and which offers the following advantages over its predecessors because the new speed sensor: provides considerably longer life, ameliorates the tolerance problem, makes provision for easy initial adjustment, is friction free, can be mass produced at low cost, is adaptable to present day vehicles, and is fabricated by a novel manufacturing process.

BRIEF DESCRIPTION OF THE DRAWINGS

FIG. 1 is a view looking at the end of an automobile rear axle assembly with the wheel and brake drum removed and rear axle flange partially sectioned to show the wheel speed sensor.

FIG. 2 is a sectional view taken generally along the line 2–2 of FIG. 1.

FIG. 3 shows the tone wheel disconnected from the vehicle.

FIG. 4 is a sectional view along the line 4–4 of the tone wheel shown in FIG. 3.

FIG. 5 is an enlarged detail of the pickup and tone wheel showing the provision for easy first assembly adjustment of the clearance between the pole piece of the pickup and the teeth of the tone wheel.

FIG. 6 is a sectional view similar to that of FIG. 4 of an alternate form of the invention.

DETAILED DESCRIPTION OF THE INVENTION

FIGURES 1 and 2 show a conventional rear axle housing 10 containing an axle 12 formed with a flange 14 into which are pressed the usual wheel mounting bolts 16. A brake-backing plate 18 to which is attached the usual parts of a brake such as the shoes 20 is mounted by bolts 22 and nuts 24 to a flange 26 of the axle housing 10. The outer face of the axle flange 14 is formed with a pilot projection 28 which usually is made accurately concentric with the bearing surfaces 29 of the axle 12. The central bore 31 of a brake drum 30 pilots on the projection 28 and the drum 30 is held in place by being clamped between the wheel (not shown) and the axle flange 14.

To carry out the invention there is provided a tone wheel assembly 32 which consists of a large diameter cup-shaped stamping 34 and a rather massive cross section ring 36 of ferromagnetic material formed on its outer surface with teeth 38 similar to spur gear teeth. (See FIGS. 3 and 4 in conjunction with FIGS. 1 and 2.) The cup-shaped stamping 34 is formed with a flat bottom 40 having a central opening 41 which fits closely on the pilot projection 28 of the axle flange 14 and an offset portion 42 of generally cylindrical or, as illustrated, conical form terminating at its inner margin in a short radial flange 44 to which the ring 36 is spot welded. A feature of the invention is that the ring 36 may be fabricated in a very economical manner by forming teeth on a strip or bar of suitable material, rolling the bar into circular form with the junction 46 of the end portions formed so that there is no discontinuity in the spacing of the teeth. It is not necessary to weld or braze this junction 46, but it is another feature of the invention that the ring 36 may be held in a fixture so that it is truly round and concentric with the central opening 41. Therefore, the junction 46 between the ends is held in proper relative position while the spot-welding between the rings 36 and the radial flange 44 of the cup-shaped stamping 34 is being done.

To carry out the invention further, there is provided a bracket 48 having foot portions 50 adapted to be secured under the nuts 24 on at least two of the brake mounting bolts 22, and an arm 52 extending generally radially outward into the area of the adjusting strut 54 which extends between the ends of the two brakeshoes 20 of a conventional servo-type brake. It is a feature of this invention that the relative movements of wheel mounted and axle housing mounted parts due to load variations, particularly during braking, are at a minumum in this location. Therefore, a structure capable of being located here can have a lower initial clearance between the tone wheel 32 and the pickup 60 without being in danger that the parts will be damaged by coming into rubbing contact with each other.

The arm 52 may have to be provided with offsets such as is seen at 56 in FIGURE 2 in order to avoid interference with brake parts such as the spring 58. It is fortunate that the adjusting strut area actually provides some useable space for locating the pickup 60 at a greater radial distance from the center of the wheel than is possible at almost any other location. It is, therefore, possible also to provide the maximum number of teeth 38 on the tone wheel 32. Thus, it can be seen that the features of the invention help to provide a greater number of discrete signals per unit of wheel speed and, therefore, makes it possible to obtain useful signals at lower speeds. This is a very desirable feature from the standpoint of successful operation of the adaptive braking system.

The electromagnetic pickup 60 (the exact details of the construction do not form a part of this invention but a representative method of construction is shown in U.S. application Ser. No. 44,402, filed June 1, 1970, is adjustable secured to the arm 52 so that teeth 62 formed in the projecting end of a pole piece 64 can be positioned in appropriate relationship to the teeth 38 of the ring 36. The adjustment is provided by two ears 66 formed as a part of the housing of the pickup 60 which extend closely on each side of the arm 52 so that they can be drawn into a clamped engagement therewith by tightening a clamp bolt 68 and nut 70. A pair of wire leads 72 attached to the pickup 60 extend through a suitable opening (not shown) in the brake backing plate 18 to conduct signals induced in the pickup 60 to the amplifier of the adaptive braking system.

The pickup 60 may be finally assembled by injection of a potting compound into a suitable mold which contains all of the needed parts held in their proper relationship. These parts, in addition to the pole piece 64, may include a coil 63 and a permanent magnet 65. The details are more clearly illustrated by the enlarged FIGURE 5. As a feature of the invention, this mold may be shaped so that a layer 74 of potting compound is formed over the projecting end 62 of the pole piece 64 to a predetermined depth. Upon first assembly of the wheel speed sensor onto a vehicle, it is then only necessary to slide the pickup 60 inwardly along the arm 52 of the bracket until this potting compound 74 comes into contact with the teeth 38 on the ring 36. The clamp bolt 68 and nut 70 may then be tightened. During the first periods of operation of the vehicle, the potting compound which is a relatively soft abradable plastic compound will be worn away to provide the necessary clearance between the parts without any damage resulting.

Referring now to FIGURE 6, which shows an alternate form of tone wheel assembly for use in this invention, parts which are similar to parts of the embodiment illustrated in FIGS. 1 to 4 are designated by the same numeral plus 100. In this form of the invention, the tone wheel assembly 132 includes a cup-shaped stamping 134 whose inner margin terminates in a folded over portion 76 forming a shoulder and a short cylindrical flange 78. The ring 136 is pressed onto this flange 78 until it abuts against the shoulder 76 and the outer edge of the flange 78 is then rolled up against the side of the ring 136 to form a short radial flange 80 which positively secures the ring into its place. It will be understood that in this form of the invention the ring 136 should be an integral ring or, if it is formed by rolling a strip or bar, the ends of the strip must be welded or otherwise secured together. In this method of fabrication it may be desirable to form the teeth by well-known methods after the ring has been formed and welded.

Operation of the speed sensor is as follows. Upon rotation of the vehicle wheel, the teeth 62 on the end of the pole piece 64 are successively aligned and not aligned with the teeth 38 of the tone wheel 32. When aligned, greater magnetic flux will pass through the pole piece than when the teeth 38 and 62 are not aligned. The change in flux induces a voltage in the coil 63 of the pickup 60. This will occur at a frequency equal to the number of teeth in the tone wheel times the revolutions per second of the vehicle wheel. Thus, it is only necessary to measure this frequency to determine the rotating speed of the vehicle wheel, or the vehicle speed in miles per hour, or other suitable units. Means for doing this are known in this art and do not form a part of this invention.

We claim:

1. A wheel speed sensor for use with a wheel having a rotatable and nonrotatable portion, said sensor comprising:
   a tone wheel secured to said rotatable portion;
   pickup means;
   means for attaching said pickup means to said nonrotatable portion and in a close proximity with said tone wheel wherein rotation of said tone wheel induces a voltage in said pickup means representative of the rotational velocity of said wheel;
   said tone wheel further including a first member comprising a stamping for attachment to said wheel, and a second member comprising a ferromagnetic ring secured to said stamping, said ring being formed with teeth that induce said voltage in said pickup means when passing in close proximity therewith.

2. The wheel speed sensor, as recited in claim 1, wherein said stamping is a low mass, shallow cup to fit over a flange on which said wheel is mounted, said stamping being clamped between said flange and said wheel for rotation therewith.

3. The wheel speed sensor, as recited claim 1, said stamping comprising:
   a generally cylindrical portion which extends around a flange on which said wheel is mounted;
   a bottom with a central opening adapted to fit closely on a pilot from said flange; and
   a radial flange at the inner margin of the cylindrical portion, said ferromagnetic ring being secured to said radial flange.

4. A wheel speed sensor for an adaptive braking system on an automotive vehicle having an axle housing, a brake of the servo type mounted on the axle housing with two brakeshoes connected by an adjusting strut, an axle with a wheel mounting flange and a pilot, and a wheel, said wheel speed sensor including:
   a tone wheel assembly for rotation with said wheel;
   pickup means for generating a signal representative of the rotation velocity of said wheel; and
   bracket means securing said pickup means to said axle housing and in close proximity with said tone wheel assembly;
   characterized by said bracket means extending to the area of said adjusting strut; and
   said pickup means being secured to said bracket means at the maximum possible radial distance from the center of said axle thereby permitting said tone wheel assembly to have as large a diameter as possible.

5. The wheel speed sensor, as recited in claim 4, wherein said pickup means is radially adjustable on an extending arm of said bracket, a pair of ears on said pickup means to said arm after radial adjustment.

6. The wheel speed sensor, as recited in claim 4, wherein said tone wheel assembly comprises:
   a low mass stamping for attachment to said wheel of the vehicle; and
   a heavy cross section ferromagnetic ring formed with teeth and secured to said stamping.

7. The wheel speed sensor, as recited in claim 5, wherein the pickup means has a pole piece which is initially covered to a predetermined depth with a potting compound, and a first assembly adjustment is made by bringing the potting compound into contact with said tone wheel through the use of said radial adjustment.

* * * * *